Oct. 5, 1937. P. H. DOWLING 2,094,642
MANUFACTURE OF ELECTRICAL RECTIFIERS
Filed Oct. 19, 1934

INVENTOR
Philip H. Dowling.
BY
HIS ATTORNEY

Patented Oct. 5, 1937

2,094,642

UNITED STATES PATENT OFFICE 2,094,642

MANUFACTURE OF ELECTRICAL RECTIFIERS

Philip H. Dowling, Forest Hills, Pa., assignor to The Union Switch & Signal Company, Swissvale, Pa., a corporation of Pennsylvania Application October 19, 1934, Serial No. 749,078

22 Claims. (Cl. 175—366)

My invention relates to the manufacture of electrical rectifiers, and particularly to the manufacture of rectifier elements for copper oxide rectifiers.

One object of my invention is to provide novel and improved means for removing the thin high resistance cupric oxide layer which is formed on the useful cuprous oxide layer of copper oxide rectifier elements during the oxidizing process, whereby the electrical characteristics of the rectifier elements are greatly improved.

I will describe one process of manufacture embodying my invention, and will then point out the novel features thereof in claims.

Figure 1:
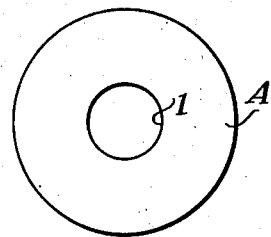
Figure 2:
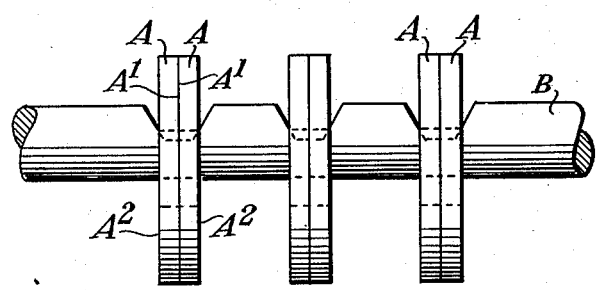
Figure 3:
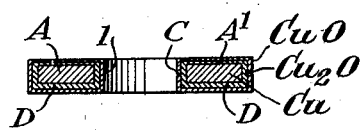
Figure 4:
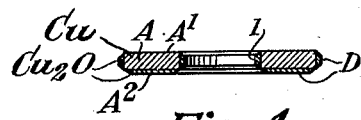

In the accompanying drawing, Fig. 1 is a view showing in elevation one form of blank ready to be prepared as a rectifier element in accordance with one process of manufacture embodying my invention. Fig. 2 is a view showing a number of blanks assembled on a support as they appear during one step in the process of manufacture. Fig. 3 is a vertical sectional view showing, in an exaggerated form, a rectifier element as it appears in another step in the process of manufacture embodying my invention. Fig. 4 is a view, showing a completed rectifier element, constructed in accordance with my invention.

Similar reference characters refer to similar parts in all four views.

Referring to the drawing, the reference character A designates a blank of suitable material such as copper. As here shown, this blank is of circular configuration, and is provided with a central aperture I, although this particular form is not essential to my invention. A number of these blanks are assembled on a suitable support B in pairs in the manner shown in Fig. 2, so that the blanks of each pair have their adjacent faces $A^1$ in contact, and the blanks are then subjected to an oxidizing process, such, for example, as the application of heat in an oxidizing atmosphere to form an oxide coating upon the blanks.

The oxidizing process is continued until a sufficient deposit of oxide is formed over the exposed surfaces of the blanks. Each blank will then appear as shown in Fig. 3, from which it will be seen that blank A is now covered with an inner coating D of cuprous or red oxide of copper and a thin outer coating C of cupric or black oxide of copper. It will also be seen from an inspection of Fig. 3 that the flat face of the blank, which is exposed during the oxidizing process, that is to say, the lower face, has a much heavier oxide coating than the upper face.

After the oxidation is completed, the elements are cooled in any suitable manner, as by quenching them in water, and the elements are then treated to remove the cupric oxide layer from the entire surface of the blank, and to remove the cuprous oxide coating from only one face $A^1$ of the blank. This treatment is a very critical step in the manufacture of the completed rectifier elements for the reason that if this is not properly done, one or more characteristics which it is desired that the finished elements should have will be lacking in the elements to a greater or lesser degree. The characteristics which it is desired the rectifier elements should have to produce the best rectifiers are as follows: (1) Substantially all of the cupric oxide should be absent in the finished elements. (2) The cuprous oxide at the edges of the elements should be eaten back far enough to remove such crystals of oxide as may have become loosened due to the oxide cracking off along the edges of the elements during the cooling of the elements. The reason for this is that it is desirable that the resistance of the elements in the high resistance direction should be as high as possible, and the presence of loose oxide crystals on the elements tends to lower the resistance of the elements in the high resistance direction. (3) There should be a clean-cut discontinuity between the mother copper and the cuprous oxide at the edges of the elements in order to result in the best electrical characteristics in the high resistance direction. That is to say, the mother copper should not be eaten away under any portion of the cuprous oxide layer. Furthermore, the edges of the cuprous oxide layer should have contours which are regular rather than jagged with single crystals here and there jutting out over the mother copper. (4) No finely divided copper which might short-circuit the junction between the copper and the cuprous oxide at the edges of the elements should be left on the elements. (5) Any inter-crystalline or other cracks which may have been formed in the cuprous oxide must not have become eaten into by the chemicals which are used to remove the cupric oxide because if these cracks are eaten into, the elements may not stand ordinary assembly pressure without injuring the copper-cuprous oxide junction in such manner as to result in low resistance of the elements in the high resistance direction. Furthermore, if the cracks in the cuprous oxide are eaten into, the elements may not withstand momentary high voltage surges without becoming short-circuited. (6) The surface of the cuprous oxide layer should be matte rather than smooth or glossy, but this surface should not be actually rough. The reason for this is that better electrical contact with the cuprous oxide surface can be obtained when the surface is matte.

I have found that elements having all of the desirable characteristics just enumerated can be consistently produced by chemically treating the oxidized blanks to remove the undesired oxide coating. This chemical treatment consists in subjecting the oxidized blanks to the action of a reagent which will remove the cupric oxide without removing much of the cuprous oxide. I have discovered that a weak solution of sulphuric acid and hydrochloric acid in water is particularly suitable for this purpose. The concentration of the acids in this solution is not critical, and tests indicate that satisfactory results may be obtained by a solution having any concentration of sulphuric acid up to at least 25% by volume and any concentration of hydrochloric acid up to at least 1% by volume. However, a solution consisting of 2% by volume of sulphuric acid and .1% by volume of hydrochloric acid in distilled water is preferred. In order to prevent impurities from getting into the solution, the solution should be kept in a tank of material which is not attacked by the acids. The temperature at which the solution is used is not critical, but the desired action of the solution is materially speeded up and elements having a higher resistance in the high resistance direction are produced if the solution is hot, preferably at a temperature of between 80° and 100° centigrade. The elements are preferably immersed in the solution for a time interval which is approximately twice as long as is required to remove the cupric oxide. After the elements have been immersed in the solution for the desired period of time, the elements are then removed from the solution, washed in water and thoroughly dried. The elements will then have all of the desirable characteristics previously enumerated with the exception that a coating of finely divided copper will be left on the elements. The presence of the hydrochloric acid in the sulphuric and hydrochloric acid solution results in cleaner cut cuprous oxide edges than could be obtained if the hydrochloric acid were absent from the solution. This effect appears to be caused by the chlorine provided by the hydrochloric acid, and any other chemical which would provide the same chlorine content, such for example, as sodium chloride, could be substituted in the solution in place of the hydrochloric acid. The amount of chlorine which is provided in the solution by any concentration of hydrochloric acid can, of course, be accurately determined by calculation, the amount which is provided by 1% by volume of hydrochloric acid being approximately 4.5 grams per liter in the form of free chlorine or soluble chlorides.

The chemical treatment of the elements may also consist in immersing the elements for two or three seconds in concentrated nitric acid. This treatment of the elements is preferably done after the elements have been subjected to the action of the reagent for removing the undesired oxide, and the effect of the nitric acid on the elements is to remove any finely divided copper which may have been left on the elements by the previous chemical treatment of the elements, and to dissolve any loose or broken crystals remaining on the surface of the cuprous oxide. When the reagent for removing the cupric oxide is the previously described sulphuric and hydrochloric acid solution, the nitric acid solution will remove from the elements all traces of the finely divided copper which was left on the elements by this solution and will produce a further cleaning up of the copper-cuprous oxide junction at the edges of the elements. The nitric acid solution, however, has the undesirable effect on the elements of causing the cuprous oxide surface to be somewhat smoother than is desirable. After the elements have been subjected to the action of the nitric acid they are again washed in water to remove all traces of the acid from the elements.

The treatment of the elements may further consist in subjecting the elements to the action of an aqueous solution of acetic acid. This solution is preferably used at a temperature of between 80° and 100° centigrade, and may consist, for example, of 25% by volume of acetic acid in tap water, although the concentration of the acid is not critical. The acetic acid has the effect on the elements of roughing or etching the surface of the cuprous oxide and, if the elements are immersed in this solution for ten or fifteen minutes after they have been subjected to the action of nitric acid in the manner previously described, the surface of the cuprous oxide will be etched sufficiently so that it will have the proper degree of roughness to provide the best electrical contact with this surface. The acetic acid solution brings down no finely divided copper, and the elements after being subjected to the action of this solution may be merely washed in water and dried. Each element will then appear as illustrated in Fig. 4 in which D designates the coating of cuprous oxide remaining on the inner and outer edges of the copper blank and on one face $A^2$ of the blank.

The elements after being removed from the acetic acid solution and washed and dried can be immediately treated to improve the contact with the cuprous oxide surface. This treatment may consist, for example, in applying finely divided carbon to this surface in the usual and well-known manner. The elements are then ready for the application of contact members, such for example, as are disclosed in Letters Patent of the United States No. 1,640,335, granted to L. O. Grondahl, on Aug. 23, 1927.

It should be pointed out that while I have described my invention in connection with the preparation of elements which, when ready for use, have cuprous oxide on only one side, my invention is equally useful in the preparation of elements which, when ready for use, have cuprous oxide on both sides.

It should also be pointed out that while in describing my invention, I have pointed out the beneficial effects of each chemical in connection with the multi-chemical procedure which I have found to produce the best rectifier elements, the particular chemicals employed in this procedure will produce the same beneficial effects in other multi-chemical procedures which leave the elements in the same condition before they are subjected to the action of each particular chemical. Although I have herein shown and described only one process of manufacture of electrical rectifiers embodying my invention, it is understood that various changes and modifications may be made therein within the scope of the appended claims without departing from the spirit and scope of my invention.

Having thus described my invention, what I claim is:

1. The process of preparing a rectifier element which consists in treating a copper blank to form thereon a coating of cuprous oxide and an outer coating of cupric oxide and subjecting the oxidized blank to the action of a solution containing approximately two per cent by volume of sulphuric acid and approximately one-tenth of one per cent by volume of hydrochloric acid in water.

2. The process of preparing a rectifier element which consists in oxidizing a copper blank to form thereon a coating of cuprous oxide and an outer coating of cupric oxide, and subjecting the oxidized blank to the action of a hot solution containing approximately two per cent by volume of sulphuric acid and approximately one-tenth of one per cent by volume of hydrochloric acid in water.

3. The process of preparing a rectifier element which consists in oxidizing a copper blank to form thereon a coating of cuprous oxide and an outer coating of cupric oxide, and subjecting the oxidized blank to the action of a hot solution containing approximately two per cent by volume of sulphuric acid and approximately one-tenth of one per cent by volume of hydrochloric acid in water for a time interval which is approximately twice as long as is required to dissolve the cupric oxide coating.

4. The process of preparing a rectifier element which consists in treating a copper blank to form thereon a coating of cuprous oxide and an outer coating of cupric oxide, removing the cupric oxide coating from the oxidized blank by means which leaves a layer of finely divided copper on the blank, and then removing the layer of finely divided copper from the blank by nitric acid.

5. The process of preparing a rectifier element which consists in treating a copper blank to form thereon a coating of cuprous oxide and an outer coating of cupric oxide, removing the cupric oxide coating from the oxidized blank by means which leaves a layer of finely divided copper on the blank, removing the layer of finely divided copper from the blank by means which leaves the surface of the cuprous oxide relatively smooth, and etching the cuprous oxide layer by subjecting the blank to the action of acetic acid.

6. The process of preparing a rectifier element which consists in treating a copper blank to form thereon a coating of cuprous oxide and an outer coating of cupric oxide, removing the cupric oxide by means which leaves the cuprous oxide surface relatively smooth, and etching the cuprous oxide surface to roughen it by means of acetic acid.

7. The process of preparing a rectifier element which consists in treating a copper blank to form thereon a coating of cuprous oxide and an outer coating of cupric oxide, removing the cupric oxide by means which leaves the cuprous oxide surface relatively smooth, and etching the cuprous oxide surface to roughen it by immersing the element from ten to fifteen minutes in a hot solution containing approximately twenty-five per cent by volume of acetic acid in water.

8. The process of preparing a rectifier element which consists in forming on a copper blank a coating of cuprous oxide and an outer coating of cupric oxide, and then successively treating the blank with a reagent containing sulphuric and hydrochloric acid, with nitric acid, and with acetic acid.

9. The process of preparing a rectifier element which consists in forming on a copper blank a coating of cuprous oxide and an outer coating of cupric oxide, immersing the oxidized blank in a hot solution containing two per cent by volume of sulphuric acid and one-tenth of one per cent by volume of hydrochloric acid in distilled water for a time interval which is approximately twice as long as is required to dissolve the cupric oxide coating, immersing the blank for two or three seconds in concentrated nitric acid, and then immersing the blank for from ten to fifteen minutes in a hot solution containing approximately twenty-five per cent by volume of acetic acid in water.

10. The step in the manufacture of a copper oxide rectifier element which consists in chemically treating an oxidized blank to remove the outer cupric oxide layer by subjecting the blanks to the action of a reagent containing sulphuric acid and hydrochloric acid, and then chemically treating the blank by successively subjecting it to the action of nitric acid, and to the action of acetic acid.

11. The process of preparing a rectifier element which consists in forming on a copper blank a coating of cuprous oxide and an outer coating of cupric oxide, and then removing the cupric oxide coating by dissolving it with a weak sulphuric acid solution containing approximately one-tenth of one per cent by volume of hydrochloric acid.

12. The process of preparing a rectifier element which consists in heating a copper blank to form on the blank a cuprous oxide coating and an outer cupric oxide coating, quenching the heated oxidized blank in water to cool it, subjecting the blank to the action of a hot solution containing two per cent by volume of sulphuric acid and one-tenth of one per cent by volume of hydrochloric acid in distilled water for a time which is approximately twice as long as is required to dissolve he cupric oxide coating, washing the blank in water and drying it, subjecting the blank to the action of concentrated nitric acid for two or three seconds, washing the blank, subjecting the blank to the action of a hot solution of acetic acid containing approximately twenty-five per cent by volume of acetic acid in water, and again washing and drying the blank.

13. The process of preparing a rectifier element which consists in forming on a copper blank a coating of cuprous oxide and an outer coating of cupric oxide, immersing the coated blank in a solution of sulphuric and hydrochloric acid for a time interval which is long enough to remove the cupric oxide coating, immersing the element in a nitric acid solution long enough to remove any finely divided copper left on the element by the sulphuric and hydrochloric acid solution, and immersing the element in an acetic acid solution long enough to roughen the cuprous oxide surface sufficiently to permit powdered carbon to be rubbed into the cuprous oxide surface.

14. The process of preparing a rectifier element which consists in forming on a copper blank a coating of cuprous oxide and an outer coating of cupric oxide, removing the cupric oxide coating, and then subjecting the blank to the action of nitric acid for two or three seconds.

15. The process of preparing a rectifier element which consists in forming on a copper blank a coating of cuprous oxide and an outer coating of cupric oxide, removing the cupric oxide coating, subjecting the blank to the action of nitric acid for two or three seconds, and finally subjecting the blank to the action of a hot solution of acetic acid.

16. The process of preparing a rectifier element which consists in forming on a copper blank a coating of cuprous oxide and an outer coating of cupric oxide, chemically treating the oxidized blank to remove the cupric oxide coating, chemically treating the blank to remove any reduced copper left on the blank by the first treatment and to remove any loose or broken crystals from the surface of the cuprous oxide, and then etching the cuprous oxide surface to roughen it.

17. The process of preparing a rectifier element which consists in forming on a copper blank a coating of cuprous oxide and an outer coating of cupric oxide, chemically treating the oxidized blank to remove the cupric oxide, chemically treating the blank to remove any reduced copper left on the blank by the first treatment, and then etching the cuprous oxide surface to roughen it.

18. The process of preparing a rectifier element which consists in forming on a copper blank a coating of cuprous oxide and an outer coating of cupric oxide, chemically treating the blank to remove the cupric oxide, chemically treating the blank to remove any loose or broken crystals left on the blank by the first treatment, and then etching the cuprous oxide surface to roughen it.

19. The process of preparing a rectifier element which consists in oxidizing a copper blank, and treating the oxidized blank with a solution of sulphuric and hydrochloric acid containing any concentration of sulphuric acid up to at least 25% by volume and any concentration of hydrochloric acid up to at least 1% by volume.

20. The process of preparing a rectifier element which consists in oxidizing a copper blank, and treating the oxidized blank with a weak solution of sulphuric acid having in the solution an amount of chlorine equal to that which would be provided by any concentration of hydrochloric acid up to 1% by volume.

21. The process of preparing a rectifier element which consists in oxidizing a copper blank, and treating the oxidized blank by subjecting it to the action of a weak solution of sulphuric acid having in the solution any amount of chlorine in the form of free chlorine or soluble chlorides up to approximately 4.5 grams per liter.

22. The process of preparing a rectifier element which consists in oxidizing a copper blank, treating the oxidized blank by subjecting it to the action of a weak solution of sulphuric and hydrochloric acid, and subsequently treating the oxidized blank by subjecting it to the action of nitric acid.

PHILIP H. DOWLING.